United States Patent Office 3,376,358
Patented Apr. 2, 1968

3,376,358
PREPARATION OF ALIPHATIC TRIENES
Wolfgang Schneider, Broadview Heights, Ohio, assignor to The B. F. Goodrich Company, New York, N.Y., a corporation of New York
No Drawing. Filed Sept. 28, 1965, Ser. No. 491,020
8 Claims. (Cl. 260—677)

ABSTRACT OF THE DISCLOSURE 1,4,9-decatrienes are prepared by reacting a conjugated diene such as butadiene or isoprene with ethylene in the presence of a catalyst formed by reacting together a reducible compound of nickel with a reducing agent such as alkali, alkaline earth and aluminum metals, hydrides, alkoxides and alkyls thereof, and a sulfone.

---

This invention relates to an improved method for preparing 1,4,9-decatrienes.

1,4,9-decatrienes, including 1,4,9-decatriene and dimethyl-1,4,9-decatrienes, are useful third monomers in preparing sulfur-vulcanizable elastomers of ethylene and propylene. In the preparation of 1,4,9-decatriene by known methods, the yield has been lower than is desirable so that the cost of this material for use in polymerization has been higher than is acceptable for large volume commercial production of such interpolymers. I have now discovered a novel and improved process for preparing 1,4,9-decatrienes in good yields which comprises reacting a conjugated diene such as butadiene or isoprene with ethylene in the presence of a catalyst which is formed by reacting together in the 1,3-diene a reducible compound of nickel with a reducing agent such as alkali, alkaline earth and aluminum metals, hydrides, alkoxides and alkyls thereof, and a sulfone.

The reducible nickel compounds are those which are readily reduced by an alkyl metal compound. Useful nickel compounds include the halides as the chlorides and bromides, sulfates, hydroxides, nitrates, acetates, oxalates, and other salts of inorganic and organic acids and coordination compounds which are organic compound of nickel, as the chelates, in which the nickel atom is attached to two functional groups of a molecule by a main valence bond and coordinately; for example, nickel acetylacetonate.

The sulfones useful in the practice of the invention include sulfones of the formula $R_2SO_2$ and alicyclic sulfones. R may be alkyl or aryl, for example, methyl vinyl sulfone, phenyl methyl sulfone, ethyl benzyl sulfone, phenyl benzyl sulfone, ethoxy methyl sulfone, dibutyl sulfone, dioctyl sulfone, ethyl naphthyl sulfone, butadiene cyclic sulfone, chloromethyl ethyl sulfone, phenyl 2-chloroethyl sulfone, phenyl isobutyl sulfone, methyl p-aminophenyl sulfone, diphenyl sulfone, dibenzyl sulfone and the ilke.

The reducing agents which may be I–A, II–A, or III–A metals, hydrides, or alkyl derivatives thereof, are usually organo-metallic compounds, including lithium alkyls, beryllium alkyls, aluminum alkyls, mixtures of alkali, alkaline earth and aluminum metals and alkyl halides, and alkoxides, and the like. More usually employed are aluminum alkyls, alkyl alkoxides, hydrides and aluminum alkyl halides having the formula $R_3Al$ or $R_xAlX_y$ wherein R is an alkyl group containing 1 to 12 carbon atoms, preferably 2 to 8, X is an alkoxyl, hydride or a halogen atom, and $x$ is 1 or 2, $y$ is 1 or 2, and $x+y=3$. Typical compounds include triethyl aluminum, tributyl aluminum, triisobutyl aluminum, diethyl aluminum chloride, dibutyl aluminum chloride, ethyl aluminum dichloride, diethyl aluminum ethoxide, propyl aluminum dichloride, diisobutyl aluminum chloride, and mixtures thereof. Other useful organo-metallic compounds include zinc diethyl, and Grignard reagents as ethyl magnesium bromide and other alkyl magnesium halides, also wherein the alkyl group contains 1 to 12 carbon atoms.

In addition to the organo-metallic compounds, metals which have a reducing action on nickel compounds can be used as reducing agents, for example metals belonging to I–A, II–A or III–A or the Lanthanide group of the Periodic Table. Of these metals it is preferred to use lithium, sodium, potassium, magnesium, calcium, strontium, beryllium, barium, aluminum, gallium, indium, and cerium. They are conveniently used in a condition in which they have a large surface, for example, in the form of chips or powder. Obviously, alloys or mixtures of two of the said metals may also be used. In many cases the use of an alkyl or aryl halide or a halide of an element of Group II–A or III–A along with the metal is of advantage. Of the halides, the bromides and chlorides are preferred. Examples of suitable compounds are allyl chloride and bromide, ethyl chloride and bromide, boron trichloride, aluminum chloride, and the like.

In the preparation of the catalyst, the nickel compound and reducing agent are reacted together in the presence of a diene. The sulfone may be added during this reaction or thereafter. Suitable 1,3-dienes are butadiene-1,3, isoprene, and the like.

The reaction may be conducted over a wide range of temperatures and pressures. Normally, the reaction is conducted at a temperature above room temperature, that is, about 25° C. to temperatures as high as about 250° C. More preferably, the reactions are conducted at temperatures in a range of about 50° C. to 150° C. Higher temperatures favor formation of the trienes.

The reaction may be carried out at atmospheric pressure, but usually is at higher pressure. This is determined by the vapor pressure of the 1,3-diene and the solubility of ethylene in the 1,3-diene at that temperature and pressure. The pressure of the reactor may range from about 100 p.s.i.g. to about 5,000 p.s.i.g. and more normally at pressures of about 200 p.s.i.g. to about 1,000 p.s.i.g., more preferably less than 1,000 p.s.i.g. as 500 p.s.i.g. if no solvent is present.

The molar ratio of reactants include from about $10^{-1}$ to $10^{-8}$, preferably $10^{-3}$ to $10^{-5}$ mol of nickel per mol of diene; 0.1 to 10 moles of sulfone per mol of nickel, preferably 0.25 to 2 mols per mol equivalent of nickel; and 1 mol equivalent of nickel to 1 to 10 mol equivalents of reducing compound per mol of nickel. On a weight basis, per 100 weight parts of conjugated 1,3-diene, from $10^{-1}$ to $10^{-3}$ weight parts of nickel acetylacetonate, $10^{-1}$ to $10^{-4}$ weight percent sulfone and about 1 to $10^{-3}$ weight percent reducing agent may be used. Larger amounts of catalyst are not normally required.

It is convenient to carry out the process without a solvent. If it is desired to use solvents, suitable solvents include aliphatic, cycloaliphatic and aromatic hydrocarbons, such as hexane, heptane, cyclooctane, benzene, hydrocarbon mixture of petroleums boiling between 60 and 200° C. Purified anhydrous starting materials and solvents are employed.

A general procedure for preparation of the 1,4,9-decatrienes is carried out by suspending the nickely compound and the sulfone in the conjugated diene. This mixture is cooled to below about 0° C. The reducing agent is added slowly over a period of time. The mixture is agitated while maintaining the temperature at about —10° C. to 0° C. The resulting solution is then placed in an autoclave pressure with ethylene and heated at about 75 to 85° at 500 p.s.i. for several hours. The autoclave is then cooled and depressured, and the 1,4,9-decatriene isolated by distillation. The following examples demonstrate specific embodiments of this invention.

EXAMPLE I

In a reactor 113 grams of 1,3-butadiene was cooled to −10° C. and 1 gram (3.9 millimols) of nickel acetylacetonate was stirred into the butadiene. Thereafter 3 ml. of triisobutyl aluminum and 1.7 gram (7.8 millimols) of diphenyl sulfone were stirred into butadiene-1,3. After about 30 minutes with agitation this catalyst solution was charged to a cool 320 ml. autoclave and 56 grams of ethylene charged into the autoclave. The reactor was then heated to 80 to 95° C. for 65 hours. The reactor was vented and the unreacted butadiene-1,3 and ethylene flashed off. A conversion of 98% yield of 60.2 weight percent of 1,4,9-decatriene was obtained. When this example is repeated with isoprene instead of butadiene-1,3 improved yields of dimethyl-1,4,9-decatrienes are obtained.

EXAMPLE II

In a reactor 190 ml. of 1,3-butadiene was cooled to −10° C. and 1 gram of nickel acetylacetonate was stirred into the butadiene. Then 0.23 gram of butadiene cyclic sulfone was stirred into the butadiene-1,3 and thereafter 3 ml. of triisobutyl aluminum was added. After about 30 minutes with agitation this catalyst solution was charged to a cool 320 ml. autoclave and 47 grams of ethylene charged into the autoclave. The reactor was then heated to 80 to 95° C. for 65 hours. The reactor was vented and the unreacted butadiene-1,3 and ethylene flashed off. A yield of 66.6% of 1,4,9-decatriene was obtained. When this example was repeated with diethyl aluminum hydride and diethyl aluminum chloride in place of triisobutyl aluminum similar improved yields of 1,4,9-decatriene were obtained.

EXAMPLE III 90 grams of nickel acetylactonate and 20 grams of butadiene cyclic sulfone were suspended in 3 quarts of butadiene at a temperature of −10° C. 180 ml. triisobutyl aluminum in benzene was slowly added to the mixture. The resulting catalyst solution was then charged under an inert gas to a 15 gallon reactor which contained 9 gallons of butadiene-1,3. The reactor was heated to 80° C. and the reaction was conducted in the presence of ethylene under a pressure of 600 p.s.i.g. ethylene for 24 hours. A yield of 53.2% of high purity 1,4,9-decatriene and 24.8% cyclodecadiene were obtained at a conversion of 98%. When this example was prepared with isoprene cyclic sulfone a yield of 62.4% of 1,4,9-decatriene was obtained.

EXAMPLE IV

In a reactor 124 grams of 1,3-butadiene was cooled to −10° C. and 1 gram of nickel acetylacetonate was stirred into the butadiene. Thereafter 3 ml. of triisobutyl aluminum and 0.35 gram of t-butyl butadiene cyclic sulfone were stirred into the butadiene-1,3. After about 30 minutes with agitation this catalyst solution was charged to a cool 320 ml. autoclave and 34 grams of ethylene charged into the autoclave. The reactor was then heated to 80 to 95° C. for 45 hours. The reactor was vented and the unreacted butadiene-1,3 and ethylene flashed off. A conversion of 92% and a yield of 61.7 weight percent of 1,4,9-decatriene was obtained.

EXAMPLE V

In a reactor 120 grams of 1,3-butadiene was cooled to −10° C. and 1 gram of nickel acetylactonate was stirred into the butadiene. Thereafter 3 ml. of triisobutyl aluminum and 0.46 gram of divinyl sulfone were stirred into the butadiene-1,3. After about 30 minutes with agitation this catalyst solution was charged to a cool 320 ml. autoclave and 44 grams of ethylene charged into the autoclave. The reactor was then heated to 90° C. for 65 hours. The reactor was vented and the unreacted butadiene-1,3 and ethylene flashed off. A yield of 59.7 weight percent of 1,4,9-decatriene was obtained.

EXAMPLE VI

In a reactor 111 grams of 1,3-butadiene was cooled to −10° C. and 1 gram of nickel acetylacetonate was stirred into the butadiene. Thereafter 3 ml. of triisobutyl aluminum and 0.91 gram of phenyl p-toluyl sulfone were stirred into the butadiene-1,3. After about 30 minutes with agitation this catalyst solution was charged to a cool 320 ml. autoclave and 54 grams of ethylene charged into the autoclave. The reactor was then heated to 80 to 85° C. for 65 hours. The reactor was vented and the unreacted butadiene-1,3 and ethylene flashed off. A conversion of 98% and yield of 58 weight percent of 1,4,9-decatriene was obtained.

Example I was repeated with two other reducing agents, (1) 10 millimols of zincdiethyl and (2) 10 millimols of ethyl magnesium bromide, and nickel oxalate, nickel bromide, and nickel dimethyl glyoxime. Good yields of 1,4,9-decatriene were obtained in each run.

The 1,4,9-decatrienes polymerize readily with ethylene and propylene to form sulfur-vulcanizable products. One commercial and economic advantage of this process is that polymerization grade butadiene-1,3 and isoprene are not required. Streams from ethylene cracking units which contain dienes may be used in preparing the 1,4,9-decatrienes.

I claim:

1. A method for preparing aliphatic 1,4,9-decatrienes which comprises reacting conjugated dienes containing 4 to 6 carbon atoms with ethylene in the presence of a catalyst comprising nickel in a reduced state prepared by reacting together a compound of nickel, a reducing agent selected from the group consisting of I-A, II-A, and III-A metals and their hydride, alkyl and alkyl halide derivatives, and a sulfone.

2. The method for preparing aliphatic 1,4,9-decatrienes which comprises reacting a conjugated diene selected from the group consisting of butadiene or isoprene with ethylene in the presence of a catalyst comprising a salt of nickel reacted with an aluminum compound having the structure $R_3Al$ or $R_xAlX_y$, wherein R is an alkyl group containing 1 to 12 carbon atoms, X is an alkoxyl, hydrogen or a halogen atom, $x$ is 1 or 2, $y$ is 1 or 2, and $x+y=3$, and a sulfone.

3. A method for preparing aliphatic 1,4,9-decatrienes which comprises reacting butadiene-1,3 with ethylene in the presence of a catalyst comprising the reaction product of a nickel salt in a concentration of from $10^{-3}$ to $10^{-5}$ mol of nickel per mol of butadiene-1,3, isoprene or piperylene, 1 to 10 mol equivalents of an alkyl aluminum compound having the structure $R_3Al$ and $R_xAlX_y$ wherein R is an alkyl group containing 1 to 12 carbon atoms, X is a halogen atom, $x$ is 1 or 2, $y$ is 1 or 2, and $x+y=3$, to 1 mol equivalent of nickel and 0.1 to 10 mols of sulfone having the formula $R_2SO_2$ wherein R is an alkyl or aryl radical and alicyclic sulfones.

4. The method of claim 2 wherein the nickel salt is an acetylacetonate, the aluminum compound has the formula $R_3Al$ and the sulfone has the formula $R_2SO_2$ and R is selected from the group consisting of alkyl and aryl radicals containing 2 to 12 carbon atoms.

5. A method for preparing aliphatic 1,4,9-decatriene which comprises reacting butadiene-1,3 with ethylene in the presence of a catalyst comprising a salt of nickel reacted with an aluminum alkyl, and an aryl sulfone.

6. A method for preparing aliphatic 1,4,9-decatrienes which comprises reacting butadiene-1,3 with ethylene in the presence of a catalyst comprising nickel acetylacetonate reacted with an alkyl magnesium halide, and an aryl sulfone.

7. The method for preparing aliphatic 1,4,9-decatrienes which comprises reacting a conjugated diene selected from the group consisting of butadiene-1,3 or isoprene with ethylene in the presence of a catalyst comprising a nickel salt in a concentration of from $10^{-3}$ to $10^{-5}$ mol of nickel per mol of butadiene-1,3 or isoprene, 1 to 10 mol equivalents of an alkyl aluminum compound having the formula $R_3Al$ wherein R is an alkyl radical containing 2 to 8 carbon atoms, to 1 mol equivalent of nickel and 0.1 to 10 moles of sulfone selected from the group consisting of aryl and alicyclic sulfones containing 4 to 12 carbon atoms, per mol equivalent of nickel.

8. The method of claim 7 wherein the salt is nickel acetylacetonate, the alkyl aluminum compound is triisobutyl aluminum and the sulfone is diphenyl sulfone or butadiene cyclic sulfone.

References Cited

UNITED STATES PATENTS 2,599,249  6/1952  Friedman _____ 260—680

DELBERT E. GANTZ, *Primary Examiner.*

J. D. MYERS, *Assistant Examiner.*